(12) United States Patent
Cok

(10) Patent No.: US 6,750,900 B1
(45) Date of Patent: Jun. 15, 2004

(54) METHOD AND APPARATUS FOR COMPUTING MOTION TRACKING PARAMETERS

(75) Inventor: David R. Cok, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/121,171

(22) Filed: Jul. 23, 1998

(51) Int. Cl.$^7$ ............................................. H04N 5/225
(52) U.S. Cl. .................................................. 348/169
(58) Field of Search ................................. 348/169, 170, 348/171, 172, 161; 369/44.28, 44.29, 53.28; 367/134; H04N 5/225

(56) References Cited

U.S. PATENT DOCUMENTS

| | | | | |
|---|---|---|---|---|
| 4,270,143 A | | 5/1981 | Morris .......................... 358/125 |
| 4,876,550 A | * | 10/1989 | Kelly ........................... 342/451 |
| 4,928,047 A | * | 5/1990 | Arai et al. .............. 318/568.16 |
| 5,329,368 A | | 7/1994 | Plotke ........................... 348/701 |
| 5,386,248 A | | 1/1995 | DeHaan et al. ............... 348/699 |
| 5,387,929 A | | 2/1995 | Collier .......................... 348/97 |
| 5,398,068 A | | 3/1995 | Liu et al. ...................... 348/416 |
| 5,402,185 A | | 3/1995 | DeWith et al. .............. 348/407 |
| 5,410,358 A | | 4/1995 | Shackleton et al. ......... 348/459 |
| 5,413,345 A | * | 5/1995 | Nauck ........................... 348/169 |
| 5,414,799 A | * | 5/1995 | Seraji ........................... 700/260 |
| 5,428,403 A | | 6/1995 | Andrew et al. .............. 348/699 |
| 5,450,133 A | | 9/1995 | Herpel et al. ................ 348/452 |
| 5,479,218 A | | 12/1995 | Etoh ............................. 348/699 |
| 5,493,344 A | | 2/1996 | Yu ................................ 348/699 |
| 5,512,952 A | | 4/1996 | Iwamura ...................... 348/416 |
| 5,581,527 A | * | 12/1996 | Onodera et al. ............. 367/134 |
| 5,717,463 A | * | 2/1998 | Brailean et al. ......... 375/240.12 |
| 5,732,149 A | * | 3/1998 | Kido et al. ................... 382/128 |
| 5,748,192 A | * | 5/1998 | Lindholm ..................... 345/649 |
| 5,784,339 A | * | 7/1998 | Woodsum et al. ........ 369/55.28 |
| 6,188,776 B1 | * | 2/2001 | Covell et al. ................ 382/100 |
| 6,346,942 B1 | * | 2/2002 | Endo et al. ................... 345/427 |
| 6,504,569 B1 | * | 1/2003 | Jasinschi et al. ............. 348/43 |
| 6,526,156 B1 | * | 2/2003 | Black et al. .................. 382/103 |

* cited by examiner

Primary Examiner—Nhon Diep
(74) Attorney, Agent, or Firm—Roland R. Schindler, II

(57) ABSTRACT

A method and apparatus is provided for efficient computing of perspective transformation motion tracking parameters in a sequence of images. More specifically, a set of initial positions for N points defined as (xi yi) for i=1 to N corresponding to at least one input image in a sequence of images are defined. The initial positions are preferably chosen based on image features having good edge and corner definitions. A set of mapping parameters are then generated using a matrix processor to solve linearized equations that define a set of final positions. The mapping parameters are then applied to the initial positions to define the set of final positions.

6 Claims, 2 Drawing Sheets

$$\begin{bmatrix} SUM(xi\ xi) & SUM(xi\ yi) & SUM(xi) & 0 & 0 & 0 & -SUM(xi\ xi\ xi') & -SUM(xi\ yi\ xi') \\ SUM(xi\ yi) & SUM(yi\ yi) & SUM(yi) & 0 & 0 & 0 & -SUM(xi\ yi\ xi') & -SUM(yi\ yi\ xi') \\ SUM(xi) & SUM(yi) & N & 0 & 0 & 0 & -SUM(xi\ xi') & -SUM(yi\ xi') \\ 0 & 0 & 0 & SUM(xi\ xi) & SUM(xi\ yi) & SUM(xi) & -SUM(xi\ xi\ yi') & -SUM(xi\ yi\ yi') \\ 0 & 0 & 0 & SUM(xi\ yi) & SUM(yi\ yi) & SUM(yi) & -SUM(xi\ yi\ yi') & -SUM(yi\ yi\ yi') \\ 0 & 0 & 0 & SUM(xi) & SUM(yi) & N & -SUM(xi\ yi') & -SUM(yi\ yi') \\ -SUM(xi\ xi\ xi') & -SUM(xi\ yi\ xi') & -SUM(xi\ xi') & -SUM(xi\ xi\ yi') & -SUM(xi\ yi\ yi') & -SUM(xi\ yi') & A & B \\ -SUM(xi\ yi\ xi') & -SUM(yi\ yi\ xi') & -SUM(yi\ xi') & -SUM(xi\ yi\ yi') & -SUM(yi\ yi\ yi') & -SUM(yi\ yi') & B & D \end{bmatrix} \cdot \begin{bmatrix} a \\ b \\ c \\ d \\ e \\ f \\ g \\ h \end{bmatrix} = \begin{bmatrix} SUM(xi\ xi') \\ SUM(yi\ xi') \\ SUM(xi') \\ SUM(xi\ yi') \\ SUM(yi\ yi') \\ SUM(yi') \\ -SUM(xi\ xi'\ xi') - SUM(xi\ yi'\ yi') \\ -SUM(yi\ xi'\ xi') - SUM(yi\ yi'\ yi') \end{bmatrix}$$

Eq. (9)

Where:  
$A = SUM(xi\ xi\ xi'\ xi') + SUM(xi\ xi\ yi'\ yi')$  
$B = SUM(xi\ yi\ xi'\ xi') + SUM(xi\ yi\ yi'\ yi')$  
$D = SUM(yi\ yi\ xi'\ xi') + SUM(yi\ yi\ yi'\ yi')$

FIG. 1

METHOD AND APPARATUS FOR COMPUTING MOTION TRACKING PARAMETERS

FIELD OF THE INVENTION

The invention relates in general to a method and apparatus for tracking motion within a sequence of images. More specifically, the invention relates to a method and apparatus for efficient determination and computing of perspective transformation motion tracking parameters in a sequence of images.

BACKGROUND OF THE INVENTION

A common requirement in the field of motion picture special effects is the need to track the motion of objects within a motion picture image sequence. The tracked motion of an object can be utilized, for example, to form composite image scenes in which the tracked objects are combined with other scene elements to move along with the tracked object. Alternatively, the tracking information related to a moving object can be utilized to remove unwanted motion effects from the image sequence, thereby stabilizing the image sequence to improve viewing characteristics. Still further, the tracking information may be utilized to track objects from scene to scene in a motion picture image sequence in order to apply special effects to the tracked object.

A variety of methods and devices have been proposed to detect and track movement in a sequence of images. The conventional methods and devices, however, are generally not efficient in computational requirements and speed, particularly when applied to determining and computing perspective transformation motion tracking parameters.

In view of the above, it is an object of the invention to provide a method and apparatus for efficient computing of perspective transformation motion tracking parameters in a motion image sequence.

SUMMARY OF THE INVENTION

The invention provides a method and apparatus for efficient computing of perspective transformation motion tracking parameters in a sequence of images. More specifically, a set of initial positions for N points defined as (xi yi) for i=1 to N corresponding to at least one input image in a sequence of images are defined. The initial positions are preferably chosen based on image features having good edge and corner definitions. A set of mapping parameters are then generated using a matrix processor to solve linearized equations that define a set of final positions. The mapping parameters are then applied to the initial coordinate positions to determine corresponding final positions.

These and other aspects, objects, features and advantages of the present invention will be more clearly understood and appreciated from a review of the following detailed description of the preferred embodiments of the invention, the accompanying drawings, and the appended claims.

BRIEF DESCRIPTION OF THE DRAWINGS

The invention will be described with reference to certain preferred embodiments thereof and the accompanying drawings, wherein:

FIG. 1 illustrates a matrix equation utilized for perspective transformations.

DETAILED DESCRIPTION OF THE INVENTION

Figure 2:
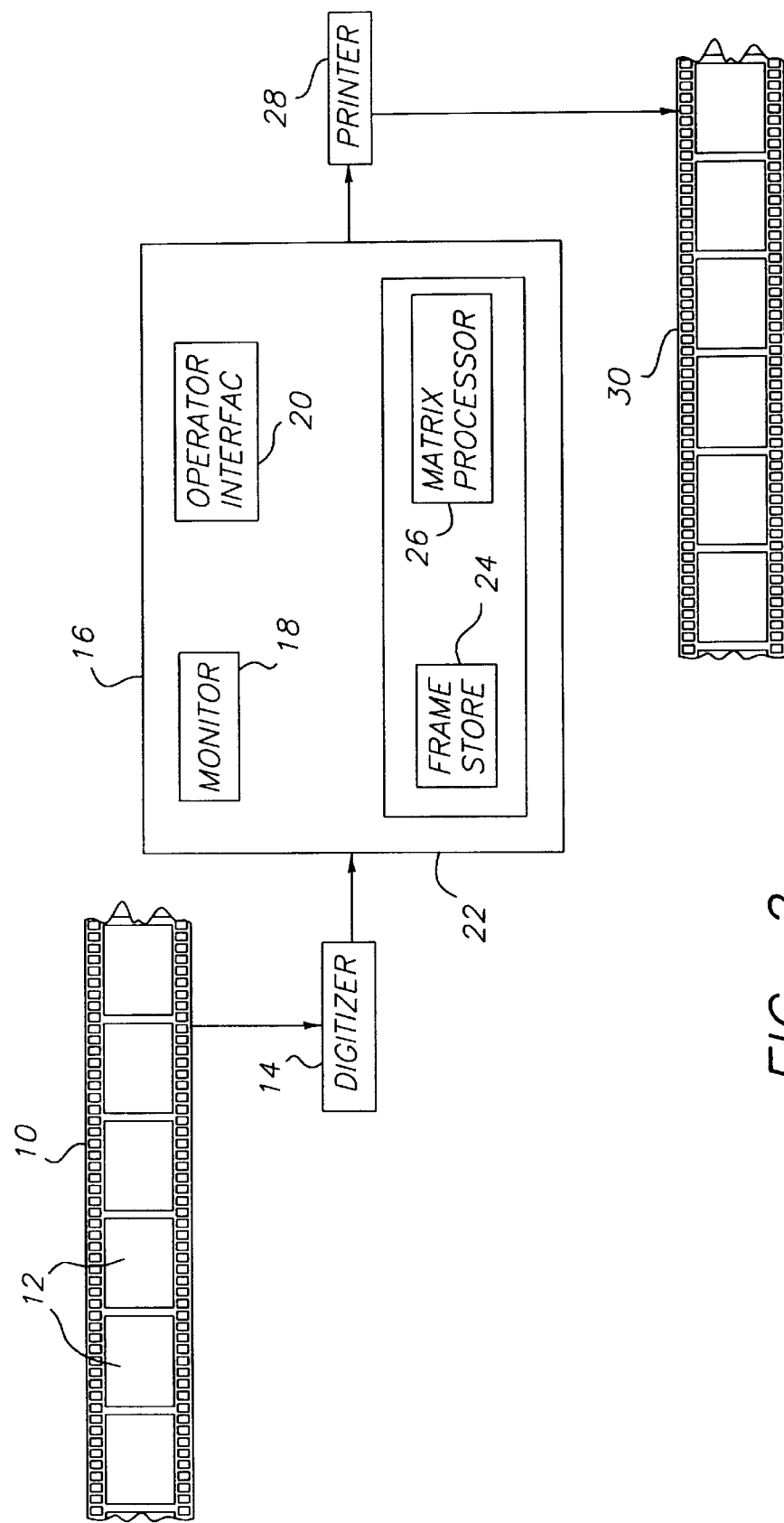
FIG. 2 illustrates a film editing system in accordance with the present invention.

The invention provides a method and apparatus for efficient computing of perspective transformation motion tracking parameters in a motion image sequence. In operation, a number of image features are selected within an image from a sequence of image frames. The image features are preferably chosen to have good edge and corner definitions. Each of the image features are then independently matched in subsequent frames of the image sequence. The result is a data set representing the individual motion of each of the chosen image features.

The individual motions are combined into a single set of motion parameters for the image. If the motion is a simple one, such as translation of the image, the joint motion of all the points is simply the average of the motions of the individual points. However, more complicated motions, such as rotation of an image feature, zoom and shear, are all examples of affine transformations and cannot be handled as easily as simple translations. In the case of affine transformations, the joint motion can be obtained from the individual motions by solving an appropriate set of linear equations.

For example, given a set of initial positions for N points defined as (xi yi) for i=1 to N, and a set of final positions, defined as (xi' yi') for i=1 to N, the parameters of an affine transformation (a, b, c, d, e, f) will map the initial positions to the final positions as follows:

$$xi' = axi + byi + c \quad \text{Eq. (1)}$$

$$yi' = dxi + eyi + f \quad \text{Eq. (2)}$$

The relationship may not hold exactly for all points, however, as there will inevitably be inaccuracies in the data. Accordingly, it is desirable to have a set of parameters the gives the best match (in the sense of minimum squared error), which is obtained by solving the matrix equations:

$$\begin{vmatrix} \text{sum}(xi\ xi) & \text{sum}(xi\ yi) & \text{sum}(xi) \\ \text{sum}(yi\ xi) & \text{sum}(yi\ yi) & \text{sum}(yi) \\ \text{sum}(xi) & \text{sum}(yi) & N \end{vmatrix} \cdot \begin{vmatrix} a \\ b \\ c \end{vmatrix} = \begin{vmatrix} \text{sum}(xi\ xi') \\ \text{sum}(yi\ xi') \\ \text{sum}(xi') \end{vmatrix} \quad \text{Eq. (3)}$$

$$\begin{vmatrix} \text{sum}(xi\ xi) & \text{sum}(xi\ yi) & \text{sum}(xi) \\ \text{sum}(yi\ xi) & \text{sum}(yi\ yi) & \text{sum}(yi) \\ \text{sum}(xi) & \text{sum}(yi) & N \end{vmatrix} \cdot \begin{vmatrix} d \\ e \\ f \end{vmatrix} = \begin{vmatrix} \text{sum}(xi\ yi') \\ \text{sum}(yi\ yi') \\ \text{sum}(yi') \end{vmatrix} \quad \text{Eq. (4)}$$

Note: The word "sum" in these equations means to sum its arguments over all N values of the subscript "i".

In the case of perspective transformation, however, the use of linear equations are not sufficient. In contrast to the affine transformation, a perspective transformation has eight parameters (a, b, c, d, e, f, g, h) that relate to the initial and final positions as follows:

$$xi' = (axi + byi + c)/(gxi + hyi + 1) \quad \text{Eq. (5)}$$

$$yi' = (dxi + eyi + f)/(gxi + hyi + 1) \quad \text{Eq. (6)}$$

Non-linear equations such as the above are conventionally solved by non-linear optimization techniques. In the present case, however, the conventional techniques would require searching for the best solution in an eight-dimensional parameter space, which is an extremely time consuming operation and computationally intense process. In order to avoid this problem, the improved approach discussed herein utilizes linearizing of the above equations to provide a more efficient solution in both time and computational requirements, namely, the following equations are solved for the best fit parameters (a, b, c, d, e, f, g, h):

$$ax_i+by_i+c=gx_ix_i'+hy_ix_i'+x_i' \qquad \text{Eq. (7)}$$

$$dx_i+ey_i+f=gx_iy_i'+hy_iy_i'+y_i' \qquad \text{Eq. (8)}$$

The linearized equations are then solved utilizing the matrix equation illustrated in FIG. 1 of the drawings.

A further improvement can be realized by utilizing a hybrid of the non-linear and linear techniques, which can be implemented to operate much faster than a straightforward eight dimensional search and gives more accurate results than the linearization approach described above. For example, if the g and h parameters are held fixed, the solution requires the solving of only two three-dimensional linear equations as in the affine transformation case discussed above. Thus, the utilization of a non-linear parameter searching technique can be limited to the two parameters g and h.

Following the above, the initial values of g and h are obtained from the linearized equations. The best values of (a, b, c, d, e, f) given g and h are then determined by solving the following matrix equations:

$$\begin{vmatrix} \text{sum}(x_i'' \ x_i'') & \text{sum}(x_i'' \ y_i'') & \text{sum}(x_i'' \ n_i'') \\ \text{sum}(y_i'' \ x_i'') & \text{sum}(y_i'' \ y_i'') & \text{sum}(y_i'' \ n_i'') \\ \text{sum}(x_i'' \ n_i'') & \text{sum}(y_i'' \ n_i'') & \text{sum}(n_i'' \ n_i'') \end{vmatrix} \cdot \begin{vmatrix} a \\ b \\ c \end{vmatrix} = \begin{matrix} \text{sum}(x_i'' \ x_i') \\ \text{sum}(y_i'' \ x_i') \\ \text{sum}(n_i'' \ x_i') \end{matrix} \qquad \text{Eq. (10)}$$

$$\begin{vmatrix} \text{sum}(x_i'' \ x_i'') & \text{sum}(x_i'' \ y_i'') & \text{sum}(x_i'' \ n_i'') \\ \text{sum}(y_i'' \ x_i'') & \text{sum}(y_i'' \ y_i'') & \text{sum}(y_i'' \ n_i'') \\ \text{sum}(x_i'' \ n_i'') & \text{sum}(y_i'' \ n_i'') & \text{sum}(n_i'' \ n_i'') \end{vmatrix} \cdot \begin{vmatrix} d \\ e \\ f \end{vmatrix} = \begin{matrix} \text{sum}(x_i'' \ y_i') \\ \text{sum}(y_i'' \ y_i') \\ \text{sum}(n_i'' \ y_i') \end{matrix} \qquad \text{Eq. (11)}$$

where $x_i''=x_i/(gx_i+hy_i+1)$;
and $y_i''=y_i/(gx_i+hy_i+1)$ and $n_i''=1/(gx_i+hy_i+1)$.
Then computing:

$$S=\text{sum}(((ax_i+by_i+c)/(gx_i+hy_i+1)-x_i')^2+((dx_i+ey_i+f)/(gx_i+hy_i+1)-y_i')^2) \qquad \text{Eq. (12)}$$

New values of g and h are then chosen using known methods for non-linear optimization and the matrix equations are solved again to find a minimum in the quantity S. The resulting values of g and h, and the corresponding values of a, b, c, d, e, f are the optimum values of the perspective transformation parameters.

Further explanation will now be provided with reference to a system for producing special effects in motion pictures. It will be understood, however, that the invention is applicable to providing motion tracking in any sequence of digital images regardless of their source of origin.

FIG. 2 illustrates a segment of motion picture film 10 including a sequence of image frames 12 which correspond to a scene or portion of a scene of a motion picture. The motion picture film 10 is passed through a digitizer 14 which generates digital data corresponding to each of the image frames. The digital data is supplied from the digitizer 14 to an editing workstation 16 that includes a monitor 18, an operator interface 20 and data processing system 22. Using the editing workstation 16, an operator can view the digitized image frames and perform various conventional editing functions including color and tone corrections, insertion of computer generated special effects and translation operations. In order to perform various translation or transformation operations, the operator selects various image features utilizing the operator interface 18 that have good edge and corner definitions to define a set of initial points. Alternatively, the initial points can be automatically selected utilizing conventional edge detection and/or feature recognition routines.

The data processing system 22 of the editing workstation 16 includes a frame store 24 and a matrix processor 26 that utilizes the matrix equations defined above to generate a set of parameters to map initial positions of a selected object to final positions. Specifically, in the case of affine transformations, the affine matrix equations are solved. In the case of perspective transformations, the perspective matrix equations are solved. The matrix processor 26 may be implemented using special purpose hardware or software or may consist of a general purpose computer processor programmed in such a way as to solve the appropriate matrix equations. After the final equations are mapped, the data processing system 22 generates a new image frame incorporating the image feature in the translated position. The output image data generated from the editing workstation 16 is then supplied to a photographic printer 28 to print a new film segment 30 incorporating the new image frame.

It will be appreciated from the foregoing description that what has been described is an efficient and effective method and apparatus for efficient computing of perspective transformation motion tracking parameters in a motion image sequence. The invention can be utilized in a variety of applications requiring tracking the motion of an object in a sequence of images including, but not limited to, applications in which composite image scenes are generated that include the tracked object, applications in which tracking information related to a moving object can be utilized to remove unwanted motion effects from the image to stabilize and image, and applications in which special effects are applied to the tracked object. Further, it will be understood that while the illustrated embodiment is directed to a digitized film segment, the invention is applicable to the processing of any digital image data stream representative of a sequence of images.

The invention has been described with reference to certain preferred embodiments thereof. It will be understood, however, that modifications and variations can be effected by a person of ordinary skill in the art without departing from the scope of the appended claims.

PARTS LIST

10 Motion Picture Film
12 Image Frame
14 Digitizer
16 Editing Workstation
18 Monitor
20 Operator Interface
22 Data Processing System
24 Framestore
26 Matrix Processor
28 Printer
30 Film Segment

What is claimed is:

1. A method for efficient determination and computing of perspective transformation motion tracking parameters in a sequence of images comprising:

defining a set of initial positions for N points defined as (xi yi) for i=1 to N corresponding to at least one input image in said sequence of images;

generating a set of mapping parameters using a matrix processor to solve a set of linearized equations; and applying the set of mapping parameters to the initial positions to define a set of final positions.

2. A method as claimed in claim 1, wherein the mapping parameters correspond to a perspective transformation having eight parameters (a, b, c, d, e, f, g, h) and relate to the initial and final positions as defined by the following non-linear equations:

$$xi'=(axi+byi+c)/(gxi+hyi+1)$$

$$yi'=(dxi+eyi+f)/(gxi+hyi+1).$$

3. A method as claimed in claim 2, wherein the step of generating a set of mapping parameters includes solving the following linearized equations:

$$axi+byi+c=gxixi'+hyixi'+xi'$$

$$dxi+eyi+f=gxiyi'+hyiyi'+yi'.$$

4. A method as claimed in claim 3, wherein the linearized equations are solved using the perspective matrix equation of FIG. 1.

5. A method as claimed in claim 1, wherein the step of generating a set of mapping parameters includes:

a.) fixing initial values of g and h b.) determining best values of (a, b, c, d, e, f) by solving the following matrix equations:

$$\text{sum}(xi''\ xi'')\ \text{sum}(xi''\ yi'')\ \text{sum}\ (xi''\ ni'')\ a\ \text{sum}(xi''\ xi')$$

$$\text{sum}(yi''\ xi'')\ \text{sum}(yi''\ yi'')\ \text{sum}\ (yi''\ ni'')\ b\ \text{sum}(yi''\ xi')$$

$$\text{sum}(xi''\ ni'')\ \text{sum}(yi''\ ni'')\ \text{sum}\ (ni''\ ni'')\ c\ \text{sum}(ni''\ xi')$$

$$\text{sum}(xi''\ xi'')\ \text{sum}(xi''\ yi'')\ \text{sum}\ (xi''\ ni'')\ d\ \text{sum}(xi''\ yi')$$

$$\text{sum}(yi''\ xi'')\ \text{sum}(yi''\ yi'')\ \text{sum}\ (yi''\ ni'')\ e\ \text{sum}(yi''\ yi')$$

$$\text{sum}(xi''\ ni'')\ \text{sum}(yi''\ ni'')\ \text{sum}\ (ni''\ ni'')\ f\ \text{sum}(ni''\ yi')$$

where xi''=xi/(gxi+hyi+1);

and yi''=yi/(gxi+hyi+1) and ni''=1/(gxi+hyi+1).

c.) computing:

$$S=\text{sum}(((axi+byi+c)/(gxi+hyi+1)-xi')^2+((dxi+eyi+f)/(gxi+hyi+1)-yi')^2)$$

d.) generating new values of g and h; and e.) repeating steps (b), (c) and (d) to find a minimum in the quantity S.

6. An apparatus for efficient determination and computing of perspective transformation motion tracking parameters in a sequence of images comprising:

means for defining a set of initial positions for N points defined as (xi yi) for i=1 to N corresponding to at least one input image in said sequence of images;

means for generating a set of perspective mapping parameters by solving linearized equations; and means for applying the set of mapping parameters to the initial positions to define a set of final positions.

* * * * *